US010065833B2

(12) United States Patent
Inoue et al.

(10) Patent No.: US 10,065,833 B2
(45) Date of Patent: Sep. 4, 2018

(54) ELEVATOR POSITION DETECTION APPARATUS

(71) Applicant: MITSUBISHI ELECTRIC CORPORATION, Chiyoda-ku (JP)

(72) Inventors: Jin Inoue, Chiyoda-ku (JP); Akihide Shiratsuki, Chiyoda-ku (JP); Keita Mochizuki, Chiyoda-ku (JP); Hiroshi Taguchi, Chiyoda-ku (JP); Masahiro Ishikawa, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/305,178

(22) PCT Filed: May 30, 2014

(86) PCT No.: PCT/JP2014/064433
§ 371 (c)(1),
(2) Date: Oct. 19, 2016

(87) PCT Pub. No.: WO2015/181955
PCT Pub. Date: Dec. 3, 2015

(65) Prior Publication Data
US 2017/0043976 A1 Feb. 16, 2017

(51) Int. Cl.
B66B 5/00 (2006.01)
B66B 3/02 (2006.01)
(Continued)

(52) U.S. Cl.
CPC .............. B66B 5/0018 (2013.01); B66B 3/02 (2013.01); G01B 7/00 (2013.01); G01D 5/20 (2013.01); B66B 9/00 (2013.01)

(58) Field of Classification Search
CPC .......... B66B 5/0018; B66B 3/02; B66B 9/00; G01B 7/00; G01D 5/00
(Continued)

(56) References Cited

U.S. PATENT DOCUMENTS 4,375,057 A * 2/1983 Weise .................... B66B 1/3492
187/394
5,274,203 A * 12/1993 Skalski ................. B66B 1/3492
187/287

(Continued)

FOREIGN PATENT DOCUMENTS

JP    1-175140 A    7/1989
JP    3306620 B2    7/2002
(Continued)

OTHER PUBLICATIONS

International Search Report dated Aug. 19, 2014, in PCT/JP2014/064433 filed May 30, 2014.

Primary Examiner — David Warren
(74) Attorney, Agent, or Firm — Xsensus, LLP

(57) ABSTRACT

In an elevator position detection apparatus, when a first diagnosis switch is closed, a diagnosis coil generates a first induced magnetic field, and when a second diagnosis switch is closed, the diagnosis coil generates a second induced magnetic field that is weaker than the first induced magnetic field. In a constant L output fault diagnosis mode in which the first induced magnetic field is generated, an output value of a measurement signal falls below a threshold regardless of whether or not a detection subject body is present in a detection region. In a constant H output fault diagnosis mode in which generation of both the first and the second induced magnetic fields is stopped, the output value of the measurement signal equals or exceeds the threshold regardless of whether or not the detection subject body is present in the detection region.

7 Claims, 7 Drawing Sheets

(51) Int. Cl.
*G01D 5/20* (2006.01)
*G01B 7/00* (2006.01)
*B66B 9/00* (2006.01)

(58) Field of Classification Search
USPC .......................................................... 187/393
See application file for complete search history.

(56) References Cited

U.S. PATENT DOCUMENTS

| | | | |
|---|---|---|---|
| 5,373,123 A * | 12/1994 | Skalski | G01B 7/345 |
| | | | 187/391 |
| 7,540,358 B2 * | 6/2009 | Okamoto | B66B 1/3492 |
| | | | 187/293 |
| 8,145,744 B2 * | 3/2012 | Gielis | B66B 13/143 |
| | | | 187/247 |
| 9,701,514 B2 * | 7/2017 | Kangas | B66B 3/02 |
| 2013/0127448 A1 * | 5/2013 | Hyacinthe | G01B 7/00 |
| | | | 324/207.15 |
| 2017/0043976 A1 * | 2/2017 | Inoue | B66B 3/02 |
| 2017/0057780 A1 * | 3/2017 | Nguyen | B66B 1/3446 |
| 2017/0176166 A1 * | 6/2017 | Kimmerle | G01B 7/14 |

FOREIGN PATENT DOCUMENTS

| | | |
|---|---|---|
| JP | 2009-263108 A | 11/2009 |
| JP | 4774427 B2 | 9/2011 |
| JP | 5380407 B2 | 1/2014 |
| WO | WO 2013/118317 A1 | 8/2013 |

\* cited by examiner

ELEVATOR POSITION DETECTION APPARATUS

TECHNICAL FIELD

This invention relates to an elevator position detection apparatus for detecting a position of an elevating body.

BACKGROUND ART

In an elevator position detection apparatus proposed in the prior art, a plurality of position detection sensors that output different output patterns in relation to respective floors are provided on a car, and when predicted transition data expected after a previous output pattern is detected do not match a current output pattern, a fault is determined to have occurred (see PTL 1).

CITATION LIST

Patent Literature

[PTL 1]
Japanese Patent Publication No. 5380407

SUMMARY OF INVENTION

Technical Problem

However, the existence of a fault in the position detection sensors cannot be determined unless the car moves between the respective floors. Moreover, a plurality of position detection sensors are required to determine whether or not a fault has occurred in the respective position detection sensors. Hence, determining the existence of a fault is time-consuming and expensive.

This invention has been designed to solve the problems described above, and an object thereof is to obtain an elevator position detection apparatus with which the existence of a fault can be determined easily at reduced cost.

Solution to Problem

An elevator position detection apparatus according to this invention includes a detection subject body, and a sensor that is provided with a detection region, and that detects the presence of the detection subject body in the detection region, wherein the detection subject body is provided in one of an elevating body and a hoistway through which the elevating body moves in a vertical direction, and the sensor is provided in the other, the sensor includes an excitation coil that applies an AC magnetic field to the detection subject body so as to cause the detection subject body to generate an eddy current magnetic field when the detection subject body is in the detection region, a diagnosis circuit that includes a diagnosis coil, a first diagnosis switch, and a second diagnosis switch, wherein a first induced magnetic field is generated by the diagnosis coil in response to the AC magnetic field from the excitation coil when the first diagnosis switch is closed, and a second induced magnetic field that is weaker than the first induced magnetic field is generated by the diagnosis coil in response to the AC magnetic field from the excitation coil when the second diagnosis switch is closed, a measurement coil that outputs a measurement signal upon reception of the AC magnetic field from the excitation coil, and reduces an output value of the measurement signal in accordance with the generated magnetic field, i.e. the eddy current magnetic field, the first induced magnetic field, or the second induced magnetic field, and a processing unit that switches an operating mode of the sensor from a normal mode, in which the second induced magnetic field is generated by the diagnosis coil, to either a constant L output fault diagnosis mode, in which the first induced magnetic field is generated by the diagnosis coil, or a constant H output fault diagnosis mode, in which generation of both the first and the second induced magnetic fields is stopped, on the basis of a diagnosis signal, and outputs a detection signal in a different output condition depending on whether or not the output value of the measurement signal from the measurement coil is lower than a threshold. In the normal mode, the output value of the measurement signal falls below the threshold when the detection subject body enters the detection region and equals or exceeds the threshold when the detection subject body leaves the detection region, in the constant L output fault diagnosis mode, the output value of the measurement signal falls below the threshold regardless of whether or not the detection subject body is in the detection region, and in the constant H output fault diagnosis mode, the output value of the measurement signal equals or exceeds the threshold regardless of whether or not the detection subject body is in the detection region.

Advantageous Effects of Invention

With the elevator position detection apparatus according to this invention, the existence of a fault in the sensor can be determined easily without moving the elevating body, i.e. while the elevating body is stationary. Moreover, a reduction in cost can be achieved.

DESCRIPTION OF EMBODIMENTS

Preferred embodiments of this invention will be described below with reference to the drawings.

First Embodiment

Figure 1:
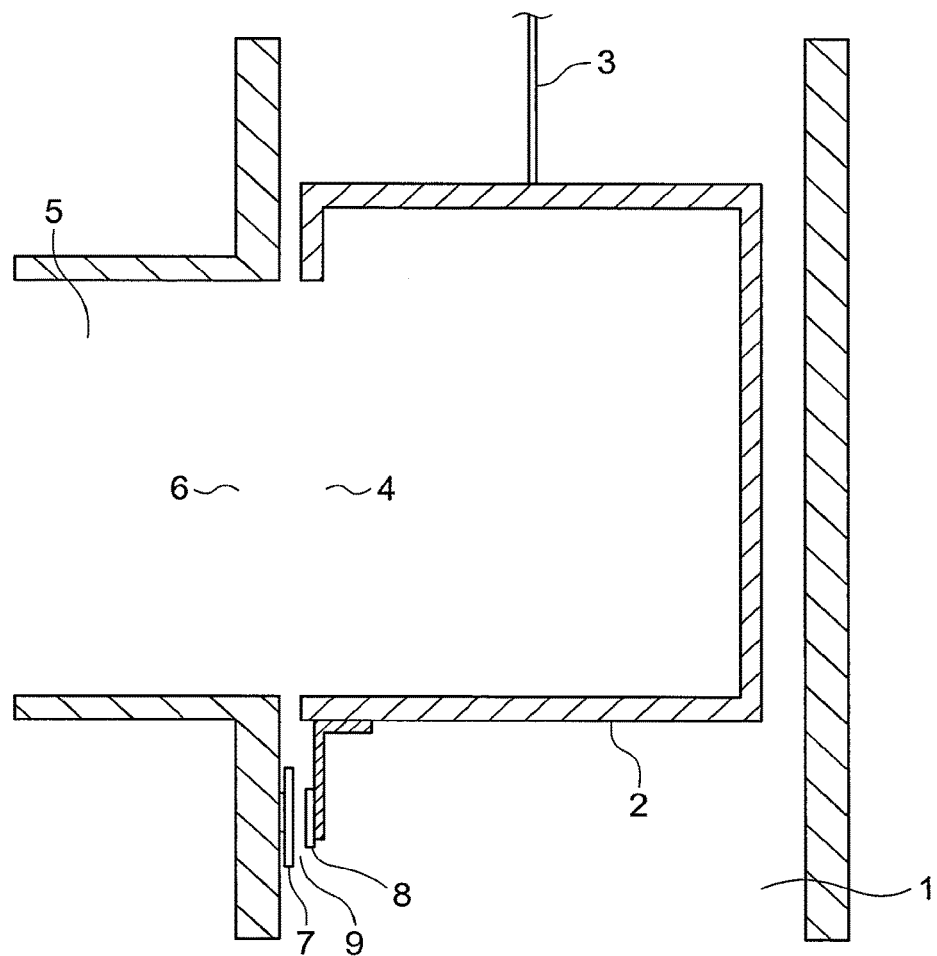
FIG. 1 is a view showing a configuration of an elevator according to a first embodiment of this invention.

FIG. 1 is a view showing a configuration of an elevator according to a first embodiment of this invention. A car (an elevating body) 2 and a counter weight (not shown) are suspended from a suspending body (a rope, a belt, or the like, for example) 3 in a hoistway 1. The suspending body 3 is wound around a drive sheave of a hoisting machine (a driving apparatus), not shown in the drawing. The car 2 and the counter weight are moved through the hoistway 1 in a vertical direction by driving force from the hoisting machine while being guided individually by a plurality of rails (not shown) disposed in the hoistway 1.

A car entrance 4 is provided in the car 2. The car entrance 4 is opened and closed by moving a car door, not shown in the drawing. A landing entrance 6 that communicates with the hoistway 1 is provided on a landing 5 of each floor. The landing entrance 6 is opened and closed by moving a landing door, not shown in the drawing. When the car 2 stops on one of the floors such that the car entrance 4 opposes the landing entrance 6, the car entrance 4 and the landing entrance 6 are opened and closed by moving the car door and the landing door together.

A plurality of metal identification plates (detection subject bodies) 7 are provided in the hoistway 1 at equal intervals in a movement direction of the car 2. In this example, the identification plates 7 are fixed to lower portions of the landing entrances 6 of the respective floors (i.e. in positions corresponding to the respective floors).

An eddy current type sensor 8 is provided in the car 2. In this example, the sensor 8 is provided on a lower portion of the car 2. The sensor 8 is provided with a detection region 9. The sensor 8 detects the presence of the identification plate 7 within the detection region 9. The identification plate 7 enters the detection region 9 when the car 2 stops on one of the floors, and leaves the detection region 9 when the car 2 moves away from the floor in an upward or downward direction. In this example, the identification plate 7 enters the detection region 9 when the sensor 8 opposes the identification plate 7 in a horizontal direction.

The sensor 8 outputs a detection signal in a different output condition depending on whether or not the identification plate 7 is present in the detection region 9. In this example, the output condition of the detection signal output by the sensor 8 corresponds to an H (high) output condition (an identification plate present output condition) when the sensor 8 determines that the identification plate 7 is present in the detection region 9, and corresponds to an L (low) output condition (an identification plate absent output condition) when the sensor 8 determines that the identification plate 7 is absent from the detection region 9. The detection signal output by the sensor 8 is transmitted to a control apparatus, not shown in the drawing.

A fault (a constant H output fault) in which the output condition of the detection signal output by the sensor 8 corresponds constantly to the H output condition regardless of whether or not the identification plate 7 is present in the detection region 9 or a fault (a constant L output fault) in which the output condition of the detection signal output by the sensor 8 corresponds constantly to the L output condition regardless of whether or not the identification plate 7 is present in the detection region 9, for example, may occur in the sensor 8. In this embodiment, the sensor 8 includes a function (a fault diagnosis function) for diagnosing both the constant H output fault and the constant L output fault. In other words, the sensor 8 can be switched between a normal mode for detecting the presence of the identification plate 7 normally, a constant L output fault diagnosis mode for diagnosing the constant L output fault, and a constant H output fault diagnosis mode for diagnosing the constant H output fault. Note that the elevator position detection apparatus includes the identification plate 7 and the sensor 8.

Figure 2:
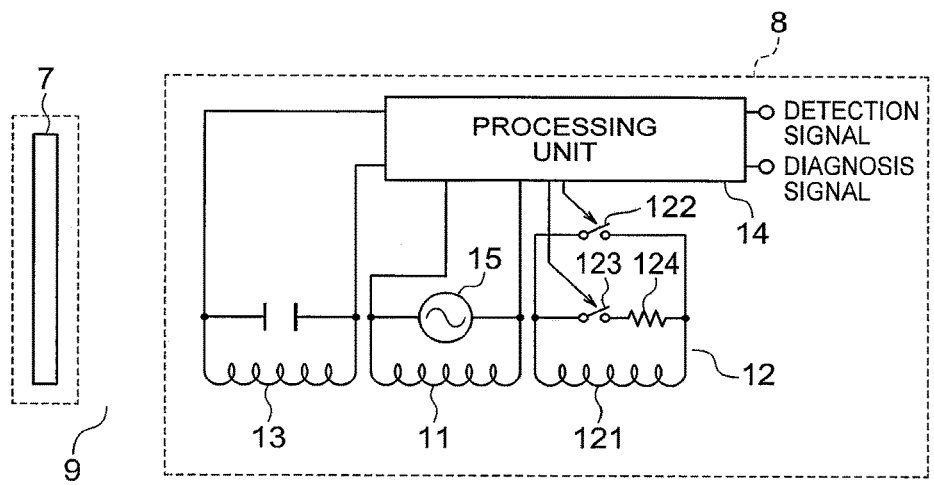
FIG. 2 is a view showing configurations of an identification plate and a sensor shown in FIG. 1.

FIG. 2 is a view showing configurations of the identification plate 7 and the sensor 8 shown in FIG. 1. FIG. 2 shows the identification plate 7 and the sensor 8 when seen from above in the movement direction of the car 2. The sensor 8 includes an excitation coil 11, a diagnosis circuit 12, a measurement coil 13, and a processing unit (a signal processing circuit) 14.

AC power is supplied to the excitation coil 11 from an AC power supply 15. A reference signal corresponding to the AC power supplied to the excitation coil 11 is transmitted to the processing unit 14. When the AC power is supplied to the excitation coil 11, the excitation coil 11 generates an AC magnetic field that reaches the detection region 9. Hence, when the identification plate 7 is in the detection region 9, the AC magnetic field generated by the excitation coil 11 is exerted on the identification plate 7. When the AC magnetic field from the excitation coil 11 is exerted on the identification plate 7, an eddy current corresponding to the AC magnetic field is generated on the identification plate 7. The identification plate 7 generates an eddy current magnetic field in accordance with the eddy current generated on the identification plate 7.

Figure 3:
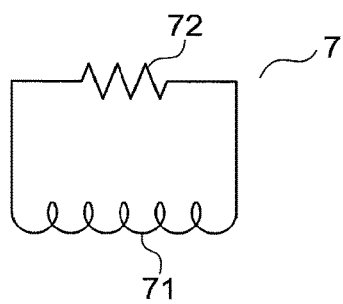
FIG. 3 is a circuit diagram showing an equivalent circuit of the identification plate shown in FIG. 2.

Here, FIG. 3 is a circuit diagram showing an equivalent circuit of the identification plate 7 shown in FIG. 2. An eddy current is generated on the identification plate 7, and therefore, as shown in FIG. 3, the equivalent circuit of the identification plate 7 is expressed as a closed circuit in which an equivalent coil 71 based on a diameter of the eddy current and a resistor 72 of the identification plate 7 are connected in series.

As shown in FIG. 2, the diagnosis circuit 12 is a closed circuit including a diagnosis coil 121, a first diagnosis switch 122 connected in parallel to the diagnosis coil 121, and a second diagnosis switch 123 and a resistor 124, which are connected in parallel to the diagnosis coil 121 and connected in series to each other.

The excitation coil 11, the measurement coil 13, and the diagnosis coil 121 are all disposed on an identical side when seen from the detection region 9. Further, of the excitation coil 11, the measurement coil 13, and the diagnosis coil 121, the measurement coil 13 is disposed in a position closest to the detection region 9, the diagnosis coil 121 is disposed in a position furthest from the detection region 9, and the excitation coil 11 is disposed in a position between the measurement coil 13 and the diagnosis coil 121. The measurement coil 13 and the diagnosis coil 121 are disposed in positions reached by the AC magnetic field from the excitation coil 11.

The processing unit 14 switches an operating mode of the sensor 8 between the normal mode, the constant L output fault diagnosis mode, and the constant H output fault diagnosis mode by controlling respective ON/OFF operations (opening/closing operations) of the first and second diagnosis switches 122, 123.

When the operating mode of the sensor 8 corresponds to the constant L output fault diagnosis mode, the first diagnosis switch 122 is closed (switched ON) and the second diagnosis switch 123 is opened (switched OFF) by the control of the processing unit 14. As a result, a closed circuit in which respective ends of the diagnosis coil 121 are short-circuited is formed in the diagnosis circuit 12. When a closed circuit in which the respective ends of the diagnosis coil 121 are short-circuited is formed in the diagnosis circuit 12, a first induction current (a short-circuit current) that is larger than the eddy current generated on the identification plate 7 is supplied to the diagnosis coil 121 in response to the AC magnetic field from the excitation coil 11. When the first induction current is supplied to the diagnosis coil 121, the diagnosis coil 121 generates a first induced magnetic field that is stronger than the eddy current magnetic field.

When the operating mode of the sensor 8 corresponds to the normal mode, the first diagnosis switch 122 is opened (switched OFF) and the second diagnosis switch 123 is closed (switched ON) by the control of the processing unit 14. As a result, a closed circuit in which the diagnosis coil 121 and the resistor 124 are connected in series is formed in the diagnosis circuit 12. When a closed circuit in which the diagnosis coil 121 and the resistor 124 are connected in series is formed in the diagnosis circuit 12, a second induction current that is reduced by the resistor 124 so as to be lower than the first induction current used in the constant L output fault diagnosis mode is supplied to the diagnosis coil 121 in response to the AC magnetic field from the excitation coil 11. When the second induction current is supplied to the diagnosis coil 121, the diagnosis coil 121 generates a second induced magnetic field that is weaker than the first induced magnetic field.

In this example, a resistance value of the resistor 124 is adjusted such that the eddy current magnetic field from the identification plate 7 is equal in strength to the second induced magnetic field. In other words, when the operating mode of the sensor 8 corresponds to the normal mode, a condition in which a virtual plate having identical properties to the identification plate 7 is disposed adjacent to the excitation coil 11 is realized by the closed circuit in which the diagnosis coil 121 and the resistor 124 are connected in series.

When the operating mode of the sensor 8 corresponds to the constant H output fault diagnosis mode, the first and second diagnosis switches 122, 123 are both opened (switched OFF) by the control of the processing unit 14. As a result, no induction current is supplied to the diagnosis coil 121, and the diagnosis coil 121 stops generating both the first and the second induced magnetic fields.

The eddy current magnetic field from the identification plate 7 and the first and second induced magnetic fields from the diagnosis coil 121 are generated by being induced by the AC magnetic field from the excitation coil 11, and therefore have a property for canceling out the AC magnetic field from the excitation coil 11.

The measurement coil 13 outputs a measurement signal corresponding to the AC magnetic field to the processing unit 14 upon reception of the AC magnetic field from the excitation coil 11. Further, when the identification plate 7 generates the eddy current magnetic field, at least a part of the AC magnetic field received by the measurement coil 13 is canceled out by the eddy current magnetic field, and when the diagnosis coil 121 generates the first or second induced magnetic field, at least a part of the AC magnetic field received by the measurement coil 13 is canceled out by the first or second induced magnetic field. As a result, the output value of the measurement signal from the measurement coil 13 decreases in accordance with the generated magnetic field, i.e. the eddy current magnetic field, the first induced magnetic field, or the second induced magnetic field.

Figure 4:
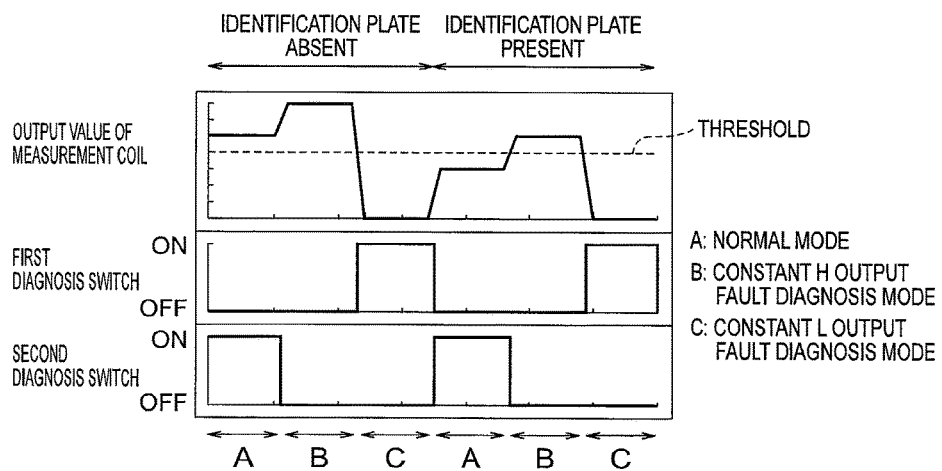
FIG. 4 is a graph showing a condition of a first diagnosis switch, a condition of a second diagnosis switch, and an output value of a measurement signal from a measurement coil in each of a normal mode, a constant H output fault diagnosis mode, and a constant L output fault diagnosis mode of the sensor, shown in FIG. 2, in each of a case where the identification plate is not in a detection region and a case where the identification plate is in the detection region.

FIG. 4 is a graph showing the condition of the first diagnosis switch 122, the condition of the second diagnosis switch 123, and the output value of the measurement signal from the measurement coil 13 in each of a normal mode A, a constant H output fault diagnosis mode B, and a constant L output fault diagnosis mode C of the sensor 8, shown in FIG. 2, in each of a case where the identification plate 7 is not in the detection region 9 and a case where the identification plate 7 is in the detection region 9. As shown in FIG. 4, when the identification plate 7 enters the detection region 9 while the operating mode of the sensor 8 corresponds to the normal mode A (in other words, when the first diagnosis switch 122 is open and the second diagnosis switch 123 is closed), a part of the AC magnetic field from the excitation coil 11 is canceled out by the eddy current magnetic field from the identification plate 7 and the second induced magnetic field from the diagnosis coil 121, and therefore the output value of the measurement signal from the measurement coil 13 decreases below a threshold set in the processing unit 14. When the identification plate 7 leaves the detection region 9 while the operating mode of the sensor 8 corresponds to the normal mode A, on the other hand, the eddy current magnetic field is no longer generated by the identification plate 7, and therefore the output value of the measurement signal from the measurement coil 13 increases such that the output value of the measurement signal from the measurement coil 13 equals or exceeds the threshold.

When the operating mode of the sensor 8 corresponds to the constant H output fault diagnosis mode B (in other words, when the first and second diagnosis switches 122, 123 are both open), the diagnosis coil 121 does not generate an induced magnetic field, and therefore the output value of the measurement signal from the measurement coil 13 remains at or above the threshold set in the processing unit 14 even after a part of the AC magnetic field from the excitation coil 11 is canceled out by the eddy current magnetic field from the identification plate 7. Hence, when the operating mode of the sensor 8 corresponds to the constant H output fault diagnosis mode B, the output value of the measurement signal from the measurement coil 13 equals or exceeds the threshold regardless of whether or not the identification plate 7 is present in the detection region 9. In other words, when the operating mode of the sensor 8 corresponds to the constant H output fault diagnosis mode B, a condition in which the identification plate 7 is not in the detection region 9 is reproduced forcibly regardless of whether or not the identification plate 7 is in the detection region 9.

When the operating mode of the sensor 8 corresponds to the constant L output fault diagnosis mode C (in other words, when the first diagnosis switch 122 is closed and the second diagnosis switch 123 is open), the diagnosis coil 121 generates the first induced magnetic field, which is strong enough to cancel out the entire AC magnetic field from the excitation coil 11, and therefore the output value of the measurement signal from the measurement coil 13 falls below the threshold regardless of whether or not the identification plate 7 is in the detection region 9. In other words, when the operating mode of the sensor 8 corresponds to the constant L output fault diagnosis mode C, a condition in which the identification plate 7 is in the detection region 9 is reproduced forcibly regardless of whether or not the identification plate 7 is in the detection region 9.

The processing unit 14 sets the operating mode of the sensor 8 in the normal mode during a normal operation in which input of a diagnosis signal from the control apparatus is stopped. The diagnosis signal from the control apparatus includes information for switching to either the constant L output fault diagnosis mode or the constant H output fault diagnosis mode. Upon reception of the diagnosis signal from the control apparatus, the processing unit 14 switches the operating mode of the sensor 8 from the normal mode to either the constant L output fault diagnosis mode or the constant H output fault diagnosis mode on the basis of the information included in the diagnosis signal.

Further, upon reception of the measurement signal from the measurement coil 13, the processing unit 14 compares the output value of the measurement signal from the measurement coil 13 with the threshold set in the processing unit 14. The processing unit 14 then outputs a detection signal to the control apparatus in a different output condition depending on whether or not the output value of the measurement signal from the measurement coil 13 is lower than the threshold. More specifically, the processing unit 14 outputs the detection signal to the control apparatus in an H output condition when the output value of the measurement signal from the measurement coil 13 is lower than the threshold, and outputs the detection signal to the control apparatus in an L output condition when the output value of the measurement signal from the measurement coil 13 equals or exceeds the threshold.

Hence, while the operating mode of the sensor 8 corresponds to the normal mode, the processing unit 14 outputs the detection signal to the control apparatus in the H output condition when the identification plate 7 enters the detection region 9, and outputs the detection signal to the control apparatus in the L output condition when the identification plate 7 leaves the detection region 9. Further, while the operating mode of the sensor 8 corresponds to the constant H output fault diagnosis mode, the processing unit 14 outputs the detection signal to the control apparatus in the L output condition regardless of whether or not the identification plate 7 is in the detection region 9. Furthermore, while the operating mode of the sensor 8 corresponds to the constant L output fault diagnosis mode, the processing unit 14 outputs the detection signal to the control apparatus in the H output condition regardless of whether or not the identification plate 7 is in the detection region 9.

The control apparatus sets the operating mode of the sensor 8 in the diagnosis mode corresponding to the information included in the diagnosis signal by outputting the diagnosis signal to the processing unit 14, and sets the operating mode of the sensor 8 in the normal mode by halting output of the diagnosis signal to the processing unit 14. When the operating mode of the sensor 8 corresponds to the normal mode, the control apparatus specifies the position of the car 2 at the point where the identification plate 7 enters the detection region 9 on the basis of the output condition of the detection signal from the processing unit 14, and controls an operation of the elevator on the basis of the specified position of the car 2.

Further, when the operating mode of the sensor 8 corresponds to the constant H output fault diagnosis mode or the constant L output fault diagnosis mode, the control apparatus determines whether or not a fault has occurred in the sensor 8 by comparing the output condition of the detection signal from the processing unit 14 with an output condition corresponding to the diagnosis mode based on the diagnosis signal. More specifically, while the operating mode of the sensor 8 corresponds to the constant H output fault diagnosis mode, the control apparatus determines that the constant H output fault has not occurred (makes an H output normal determination) when the output condition of the detection signal from the processing unit 14 is identical to the L output condition (i.e. the output condition corresponding to the constant H output fault diagnosis mode), and determines that the constant H output fault has occurred (makes an H output fault determination) when the output condition of the detection signal from the processing unit 14 differs from the L output condition. Further, while the operating mode of the sensor 8 corresponds to the constant L output fault diagnosis mode, the control apparatus determines that the constant L output fault has not occurred (makes an L output normal determination) when the output condition of the detection signal from the processing unit 14 is identical to the H output condition (i.e. the output condition corresponding to the constant L output fault diagnosis mode), and determines that the constant L output fault has occurred (makes an L output fault determination) when the output condition of the detection signal from the processing unit 14 differs from the H output condition.

Next, an operation will be described. When the car 2 stops on one of the respective floors in response to the control of the control apparatus, the identification plate 7 corresponding to the floor on which the car 2 has stopped enters the detection region 9 of the sensor 8. When the identification plate 7 enters the detection region 9, the AC magnetic field from the excitation coil 11 is exerted on the identification plate 7 such that the identification plate 7 generates the eddy current magnetic field. When the car 2 moves away from the floor in an upward or downward direction, the identification plate 7 leaves the detection region 9, and as a result, the identification plate 7 no longer generates the eddy current magnetic field.

When output of the diagnosis signal from the control apparatus to the processing unit 14 is stopped, the operating mode of the sensor 8 corresponds to the normal mode. When the operating mode of the sensor 8 corresponds to the normal mode, the elevator performs a service operation.

When the operating mode of the sensor 8 corresponds to the normal mode, the first diagnosis switch 122 is opened and the second diagnosis switch 123 is closed by the control of the processing unit 14. As a result, the diagnosis coil 121 generates the second induced magnetic field that is equal in strength to the eddy current magnetic field from the identification plate 7.

When the identification plate 7 enters the detection region 9 in the normal mode, the output value of the measurement signal from the measurement coil 13 decreases below the threshold set in the processing unit 14 in accordance with the eddy current magnetic field generated by the identification plate 7, and as a result, the detection signal is output in the H output condition from the processing unit 14 to the control apparatus. When the identification plate 7 leaves the detection region 9 in the normal mode, on the other hand, the identification plate 7 no longer generates the eddy current magnetic field, and therefore the output value of the measurement signal from the measurement coil 13 equals or exceeds the threshold, whereby the detection signal is output in the L output condition from the processing unit 14 to the control apparatus.

Upon reception of the detection signal from the processing unit 14, the control apparatus determines whether or not the car 2 is on a floor on the basis of the output condition (the H output condition or the L output condition) of the detection signal. The operation of the elevator is controlled by the control apparatus on the basis of a determination result based on the detection signal from the processing unit 14.

When a constant L output fault diagnosis is to be performed, the control apparatus outputs a diagnosis signal including information for switching to the constant L output fault diagnosis mode to the processing unit 14. As a result, the operating mode of the sensor 8 is switched from the normal mode to the constant L output fault diagnosis mode.

In the constant L output fault diagnosis mode, the first diagnosis switch 122 is closed and the second diagnosis switch 123 is opened by the control of the processing unit 14. When the operating mode of the sensor 8 corresponds to the constant L output fault diagnosis mode, the diagnosis coil 121 generates the first induced magnetic field, which is stronger than the second induced magnetic field, and as a result, the output value of the measurement signal from the measurement coil 13 falls below the threshold regardless of whether or not the identification plate 7 is in the detection region 9.

When the detection signal is input into the control apparatus from the processing unit 14 after the diagnosis signal has been output to the processing unit 14 from the control apparatus, the control apparatus compares the output condition of the detection signal from the processing unit 14 with the output condition corresponding to the diagnosis mode (the constant L output fault diagnosis mode) based on the information included in the diagnosis signal. When, as a result, the output condition of the detection signal from the processing unit 14 matches the H output condition corresponding to the constant L output fault diagnosis mode, the control apparatus makes the L output normal determination, i.e. determines that the constant L output fault has not occurred. When, on the other hand, the actual output condition of the detection signal from the processing unit 14 differs from the H output condition even though a diagnosis signal for forcing the processing unit 14 to output the detection signal in the H output condition has been output from the control apparatus to the processing unit 14, the control apparatus makes the L output fault determination, i.e. determines that the constant L output fault has occurred in the sensor 8. Thus, the constant L output fault diagnosis is performed on the sensor 8.

When a constant H output fault diagnosis is to be performed, the control apparatus outputs a diagnosis signal including information for switching to the constant H output fault diagnosis mode to the processing unit 14. As a result, the operating mode of the sensor 8 is switched from the normal mode to the constant H output fault diagnosis mode.

In the constant H output fault diagnosis mode, the first and second diagnosis switches 122, 123 are both opened by the control of the processing unit 14. When the operating mode of the sensor 8 corresponds to the constant H output fault diagnosis mode, generation of an induced magnetic field by the diagnosis coil 121 is stopped, and therefore the output value of the measurement signal from the measurement coil 13 equals or exceeds the threshold regardless of whether or not the identification plate 7 is in the detection region 9.

When the detection signal is input into the control apparatus from the processing unit 14 after the diagnosis signal has been output to the processing unit 14 from the control apparatus, the control apparatus compares the output condition of the detection signal from the processing unit 14 with the output condition corresponding to the diagnosis mode (the constant H output fault diagnosis mode) based on the information included in the diagnosis signal. When, as a result, the output condition of the detection signal from the processing unit 14 matches the L output condition corresponding to the constant H output fault diagnosis mode, the control apparatus makes the H output normal determination, i.e. determines that the constant H output fault has not occurred. When, on the other hand, the actual output condition of the detection signal from the processing unit 14 differs from the L output condition even though a diagnosis signal for forcing the processing unit 14 to output the detection signal in the L output condition has been output from the control apparatus to the processing unit 14, the control apparatus makes the H output fault determination, i.e. determines that the constant H output fault has occurred in the sensor 8. Thus, the constant H output fault diagnosis is performed on the sensor 8.

In this elevator position detection apparatus, the operating mode of the sensor 8 can be switched between the normal mode, the constant L output fault diagnosis mode, in which the first diagnosis switch 122 is closed such that the output value of the measurement signal from the measurement coil 13 falls below the threshold regardless of whether or not the identification plate 7 is in the detection region 9, and the constant H output fault diagnosis mode, in which the second diagnosis switch 123 is closed such that the output value of the measurement signal from the measurement coil 13 equals or exceeds the threshold regardless of whether or not the identification plate 7 is in the detection region 9. Therefore, the presence of the constant L output fault and the presence of the constant H output fault in the sensor 8 can be determined respectively without moving the car 2, i.e. while the car 2 is stationary, simply by opening and closing the first and second diagnosis switches 122, 123. As a result, the existence of a fault in the sensor 8 can be determined easily. Moreover, respective pluralities of the identification plate 7 and the sensor 8 are not required to perform a fault diagnosis, and therefore the cost of the elevator position detection apparatus can be reduced.

Second Embodiment

Figure 5:
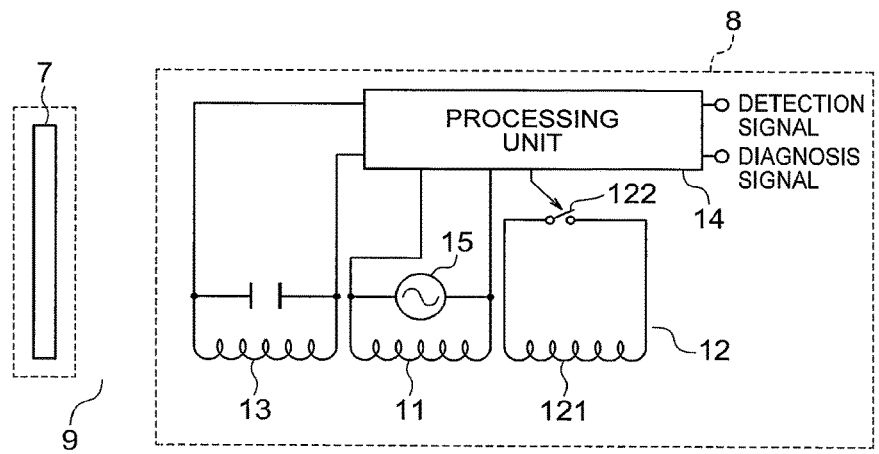
FIG. 5 is a view showing a configuration of an elevator position detection apparatus according to a second embodiment of this invention.

FIG. 5 is a view showing a configuration of an elevator position detection apparatus according to a second embodiment of this invention. Note that FIG. 5 corresponds to FIG. 2 of the first embodiment. The diagnosis circuit 12 is a closed circuit including the diagnosis coil 121 and the first diagnosis switch 122 connected in parallel to the diagnosis coil 121. The diagnosis coil 121 and the first diagnosis switch 122 are configured similarly to the first embodiment. Hence, the diagnosis circuit 12 according to this embodiment is obtained by removing the second diagnosis switch 123 and the resistor 124 from the diagnosis circuit 12 of the first embodiment.

The processing unit 14 can switch the operating mode of the sensor 8 between the normal mode and the constant L output fault diagnosis mode by controlling the ON/OFF operations (the opening/closing operations) of the first diagnosis switch 122.

When the operating mode of the sensor 8 corresponds to the constant L output fault diagnosis mode, the first diagnosis switch 122 is closed by the control of the processing unit 14. As a result, a closed circuit in which the respective ends of the diagnosis coil 121 are short-circuited is formed in the diagnosis circuit 12. When a closed circuit in which the respective ends of the diagnosis coil 121 are short-circuited is formed in the diagnosis circuit 12, the first induction current (the short-circuit current) that is larger than the eddy current generated on the identification plate 7 is supplied to the diagnosis coil 121 in response to the AC magnetic field from the excitation coil 11. When the first induction current is supplied to the diagnosis coil 121, the diagnosis coil 121 generates the first induced magnetic field that is stronger than the eddy current magnetic field. When the diagnosis coil 121 generates the first induced magnetic field, the entire AC magnetic field from the excitation coil 11 is canceled out by the first induced magnetic field. As a result, the output value of the measurement signal from the measurement coil 13 falls below the threshold regardless of whether or not the identification plate 7 is in the detection region 9.

When the operating mode of the sensor 8 corresponds to the normal mode, the first diagnosis switch 122 is opened by the control of the processing unit 14. As a result, no induction current is supplied to the diagnosis coil 121, and the diagnosis coil 121 stops generating the first induced magnetic field. Hence, while the operating mode of the sensor 8 corresponds to the normal mode, the output value of the measurement signal from the measurement coil 13 falls below the threshold when the identification plate 7 enters the detection region 9, and equals or exceeds the threshold when the identification plate 7 leaves the detection region 9.

The processing unit 14 sets the operating mode of the sensor 8 in the normal mode when input of the diagnosis signal from the control apparatus is stopped, and switches the operating mode from the normal mode to the constant L output fault diagnosis mode upon reception of the diagnosis signal from the control apparatus. While the operating mode of the sensor 8 corresponds to the normal mode, the processing unit 14 outputs the detection signal to the control apparatus in the H output condition when the identification plate 7 enters the detection region 9, and outputs the detection signal to the control apparatus in the L output condition when the identification plate 7 leaves the detection region 9. Further, while the operating mode of the sensor 8 corresponds to the constant L output fault diagnosis mode, the processing unit 14 outputs the detection signal to the control apparatus in the H output condition regardless of whether or not the identification plate 7 is in the detection region 9.

When the operating mode of the sensor 8 is set in the constant L output fault diagnosis mode after the diagnosis signal has been output to the processing unit 14, the control apparatus determines whether or not the constant L output fault has occurred in the sensor 8 by comparing the output condition of the detection signal from the processing unit 14 with the output condition (the H output condition) corresponding to the diagnosis mode (the constant L output fault diagnosis mode) based on the diagnosis signal. In other words, while the operating mode of the sensor 8 corresponds to the constant L output fault diagnosis mode, the control apparatus makes the L output normal determination, i.e. determines that the constant L output fault has not occurred, when the output condition of the detection signal from the processing unit 14 is identical to the H output condition, and makes the L output fault determination, i.e. determines that the constant L output fault has occurred, when the output condition of the detection signal from the processing unit 14 differs from the H output condition. All other configurations are identical to the first embodiment.

In this elevator position detection apparatus, the operating mode of the sensor 8 can be switched between the normal mode and the constant L output fault diagnosis mode in which the first diagnosis switch 122 is closed, and therefore the presence of the constant L output fault in the sensor 8 can be determined without moving the car 2, i.e. while the car 2 is stationary, simply by closing the first diagnosis switch 122. As a result, the existence of a fault in the sensor 8 can be determined easily. Moreover, respective pluralities of the identification plate 7 and the sensor 8 are not required to perform a fault diagnosis, and therefore the cost of the elevator position detection apparatus can be reduced.

Third Embodiment

Figure 6:
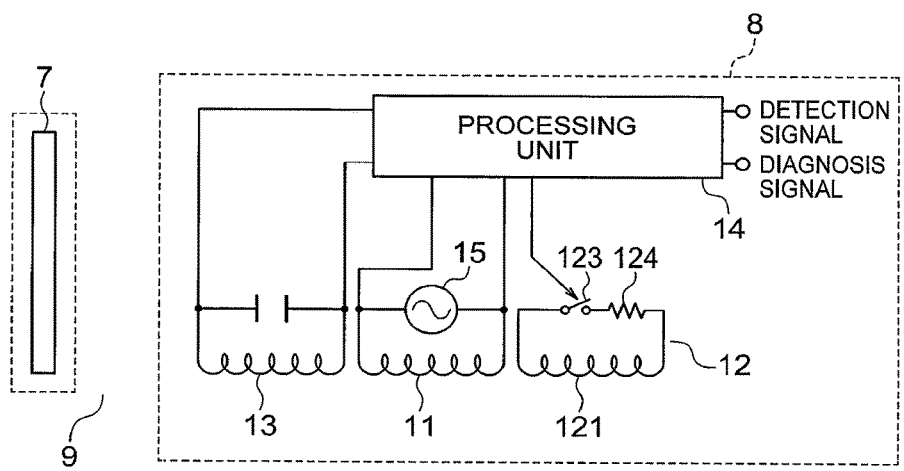
FIG. 6 is a view showing a configuration of an elevator position detection apparatus according to a third embodiment of this invention.

FIG. 6 is a view showing a configuration of an elevator position detection apparatus according to a third embodiment of this invention. Note that FIG. 6 corresponds to FIG. 2 of the first embodiment. The diagnosis circuit 12 is a closed circuit including the diagnosis coil 121, and the second diagnosis switch 123 and the resistor 124, which are connected in parallel to the diagnosis coil 121 and connected in series to each other. The diagnosis coil 121, the second diagnosis switch 123, and the resistor 124 are configured similarly to the first embodiment. Hence, the diagnosis circuit 12 according to this embodiment is obtained by removing the first diagnosis switch 122 from the diagnosis circuit 12 of the first embodiment.

The processing unit 14 can switch the operating mode of the sensor 8 between the normal mode and the constant H output fault diagnosis mode by controlling the ON/OFF operations (the opening/closing operations) of the second diagnosis switch 123.

When the operating mode of the sensor 8 corresponds to the normal mode, the second diagnosis switch 123 is closed by the control of the processing unit 14. As a result, a closed circuit in which the diagnosis coil 121 and the resistor 124 are connected in series is formed in the diagnosis circuit 12. When a closed circuit in which the diagnosis coil 121 and the resistor 124 are connected in series is formed in the diagnosis circuit 12, the second induction current that is reduced by the resistor 124 so as to be lower than the short-circuit current is supplied to the diagnosis coil 121 in response to the AC magnetic field from the excitation coil 11. When the second induction current is supplied to the diagnosis coil 121, the diagnosis coil 121 generates the second induced magnetic field. In this example, the resistance value of the resistor 124 is adjusted such that the eddy current magnetic field from the identification plate 7 is equal in strength to the second induced magnetic field.

In the normal mode, in which the diagnosis coil 121 generates the second induced magnetic field, the output value of the measurement signal from the measurement coil 13 falls below the threshold when the identification plate 7 enters the detection region 9, and equals or exceeds the threshold when the identification plate 7 leaves the detection region 9.

When the operating mode of the sensor 8 corresponds to the constant H output fault diagnosis mode, the second diagnosis switch 123 is opened by the control of the processing unit 14. As a result, no induction current is supplied to the diagnosis coil 121, and generation of an induced magnetic field by the diagnosis coil 121 is stopped. In the constant H output fault diagnosis mode, in which generation of an induced magnetic field by the diagnosis coil 121 is stopped, the output value of the measurement signal from the measurement coil 13 equals or exceeds the threshold regardless of whether or not the identification plate 7 is in the detection region 9.

The processing unit 14 sets the operating mode of the sensor 8 in the normal mode when input of the diagnosis signal from the control apparatus is stopped, and switches the operating mode from the normal mode to the constant H output fault diagnosis mode upon reception of the diagnosis signal from the control apparatus. While the operating mode of the sensor 8 corresponds to the normal mode, the processing unit 14 outputs the detection signal to the control apparatus in the H output condition when the identification plate 7 enters the detection region 9, and outputs the detection signal to the control apparatus in the L output condition when the identification plate 7 leaves the detection region 9. Further, while the operating mode of the sensor 8 corresponds to the constant H output fault diagnosis mode, the processing unit 14 outputs the detection signal to the control apparatus in the L output condition regardless of whether or not the identification plate 7 is in the detection region 9.

When the operating mode of the sensor 8 is set in the constant H output fault diagnosis mode after the diagnosis signal has been output to the processing unit 14, the control apparatus determines whether or not the constant H output fault has occurred in the sensor 8 by comparing the output condition of the detection signal from the processing unit 14 with the output condition (the L output condition) corresponding to the diagnosis mode (the constant H output fault diagnosis mode) based on the diagnosis signal. In other words, while the operating mode of the sensor 8 corresponds to the constant H output fault diagnosis mode, the control apparatus makes the H output normal determination, i.e. determines that the constant H output fault has not occurred, when the output condition of the detection signal from the processing unit 14 is identical to the L output condition, and makes the H output fault determination, i.e. determines that the constant H output fault has occurred, when the output condition of the detection signal from the processing unit 14 differs from the L output condition. All other configurations are identical to the first embodiment.

In this elevator position detection apparatus, the operating mode of the sensor 8 can be switched between the normal mode, in which the second diagnosis switch 123 is opened, and the constant H output fault diagnosis mode, in which the second diagnosis switch 123 is closed, and therefore the presence of the constant H output fault in the sensor 8 can be determined without moving the car 2, i.e. while the car 2 is stationary, simply by closing the second diagnosis switch 123. As a result, the existence of a fault in the sensor 8 can be determined easily. Moreover, respective pluralities of the identification plate 7 and the sensor 8 are not required to perform a fault diagnosis, and therefore the cost of the elevator position detection apparatus can be reduced.

Fourth Embodiment

Figure 7:
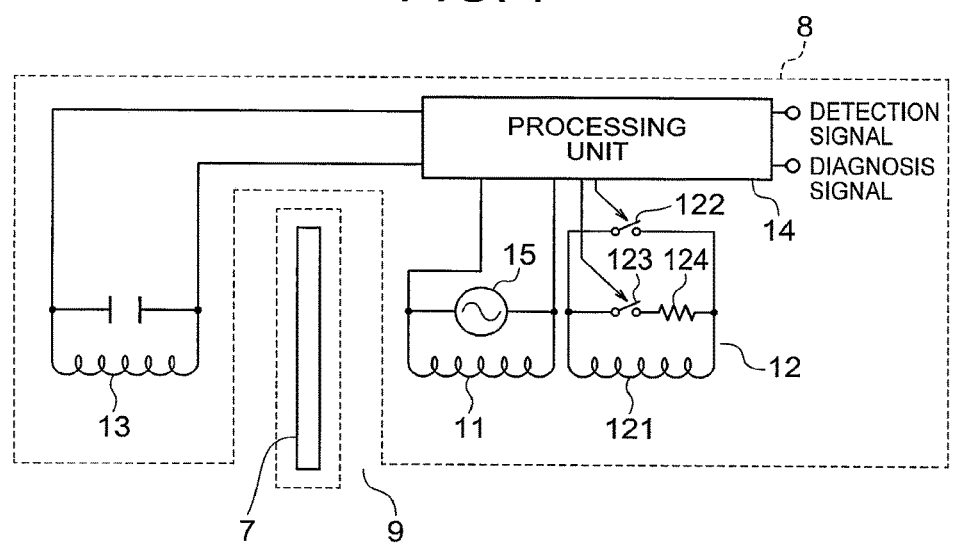
FIG. 7 is a view showing a configuration of an elevator position detection apparatus according to a fourth embodiment of this invention.

FIG. 7 is a view showing a configuration of an elevator position detection apparatus according to a fourth embodiment of this invention. In this embodiment, the detection region 9 is provided between the excitation coil 11 and the measurement coil 13 when the sensor 8 is seen from the movement direction of the car 2. Further, in this embodiment, the diagnosis coil 121 is disposed on the same side as the excitation coil 11 from the viewpoint of the detection region 9 when the sensor 8 is seen from the movement direction of the car 2. The diagnosis coil 121 is disposed in a position further away from the detection region 9 than the excitation coil 11. All other configurations are identical to the first embodiment.

By providing the detection region 9 between the excitation coil 11 and the measurement coil 13 in this manner, output variation in the measurement signal from the measurement coil 13 due to rocking of the car 2 can be reduced, and the occurrence of erroneous detections by the identification plate 7 can be suppressed. As a result, the fault diagnosis performed on the sensor 8 can be improved in precision.

Fifth Embodiment

Figure 8:
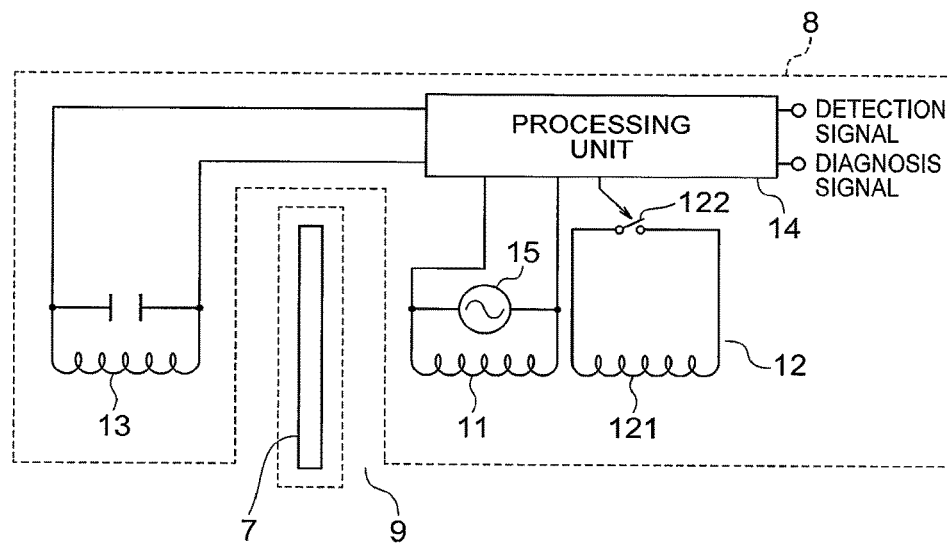
FIG. 8 is a view showing a configuration of an elevator position detection apparatus according to a fifth embodiment of this invention.

FIG. 8 is a view showing a configuration of an elevator position detection apparatus according to a fifth embodiment of this invention. In this embodiment, the diagnosis circuit 12 is configured identically to the diagnosis circuit 12 according to the second embodiment. In other words, in this embodiment, the diagnosis circuit 12 is a closed circuit in which the first diagnosis switch 122 is connected in parallel to the diagnosis coil 121. All other configurations are identical to the fourth embodiment.

By configuring the diagnosis circuit 12 as a closed circuit in which the first diagnosis switch 122 is connected in parallel to the diagnosis coil 121 in this manner, diagnosis of the constant L output fault in the sensor 8 can be improved in precision while simplifying the configuration of the diagnosis circuit 12.

Sixth Embodiment

Figure 9:
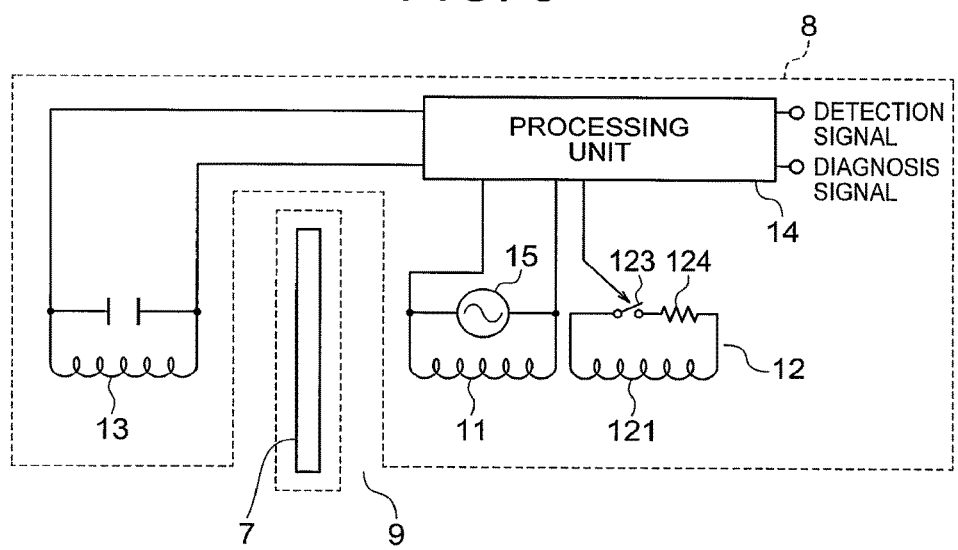
FIG. 9 is a view showing a configuration of an elevator position detection apparatus according to a sixth embodiment of this invention.

FIG. 9 is a view showing a configuration of an elevator position detection apparatus according to a sixth embodiment of this invention. In this embodiment, the diagnosis circuit 12 is configured identically to the diagnosis circuit 12 according to the third embodiment. In other words, in this embodiment, the diagnosis circuit 12 is a closed circuit in which the second diagnosis switch 123 and the resistor 124 are connected in parallel to the diagnosis coil 121 and connected in series to each other. All other configurations are identical to the fourth embodiment.

By configuring the diagnosis circuit 12 as a closed circuit in which the second diagnosis switch 123 and the resistor 124 are connected in parallel to the diagnosis coil 121 and connected in series to each other in this manner, diagnosis of the constant H output fault in the sensor 8 can be improved in precision while simplifying the configuration of the diagnosis circuit 12.

Seventh Embodiment

Figure 10:
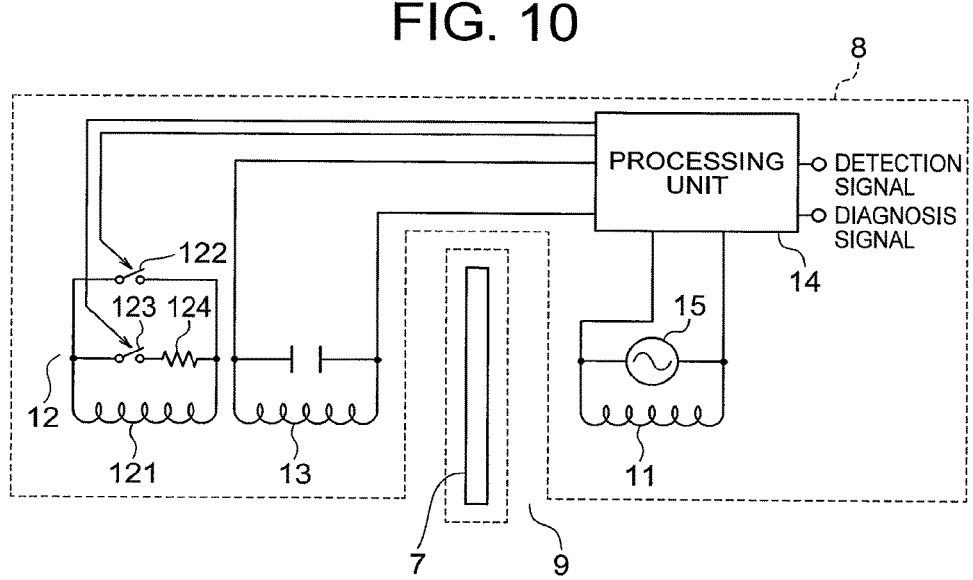
FIG. 10 is a view showing a configuration of an elevator position detection apparatus according to a seventh embodiment of this invention.

FIG. 10 is a view showing a configuration of an elevator position detection apparatus according to a seventh embodiment of this invention. In this embodiment, the detection region 9 is provided between the excitation coil 11 and the measurement coil 13 when the sensor 8 is seen from the movement direction of the car 2. Further, in this embodiment, the diagnosis coil 121 is disposed on the same side as the measurement coil 13 from the viewpoint of the detection region 9 when the sensor 8 is seen from the movement direction of the car 2. The diagnosis coil 121 is disposed in a position further away from the detection region 9 than the measurement coil 13. All other configurations are identical to the first embodiment.

By disposing the diagnosis coil 121 on the same side as the measurement coil 13 from the viewpoint of the detection region 9 in this manner, a coupling constant between the measurement coil 13 and the diagnosis coil 121 can be increased, enabling a reduction in an inductance (a number of windings) of the diagnosis coil 121. As a result, a packaging cost of the diagnosis coil 121 can be reduced.

Eighth Embodiment

Figure 11:
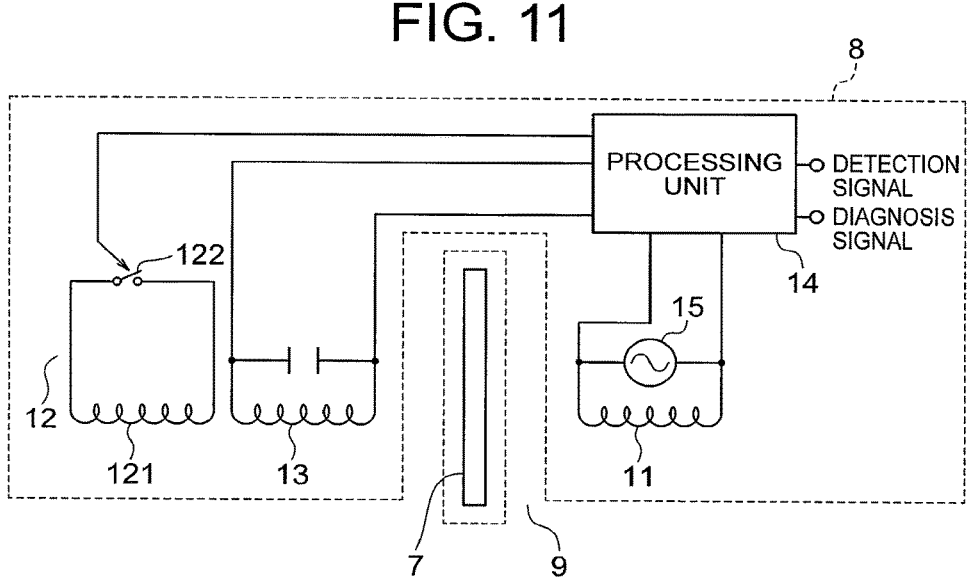
FIG. 11 is a view showing a configuration of an elevator position detection apparatus according to an eighth embodiment of this invention.

FIG. 11 is a view showing a configuration of an elevator position detection apparatus according to an eighth embodiment of this invention. In this embodiment, the diagnosis circuit 12 is configured identically to the diagnosis circuit 12 according to the second embodiment. In other words, in this embodiment, the diagnosis circuit 12 is a closed circuit in which the first diagnosis switch 122 is connected in parallel to the diagnosis coil 121. All other configurations are identical to the seventh embodiment.

By configuring the diagnosis circuit 12 as a closed circuit in which the first diagnosis switch 122 is connected in parallel to the diagnosis coil 121 in this manner, diagnosis of the constant L output fault in the sensor 8 can be improved in precision while simplifying the configuration of the diagnosis circuit 12.

Ninth Embodiment

Figure 12:
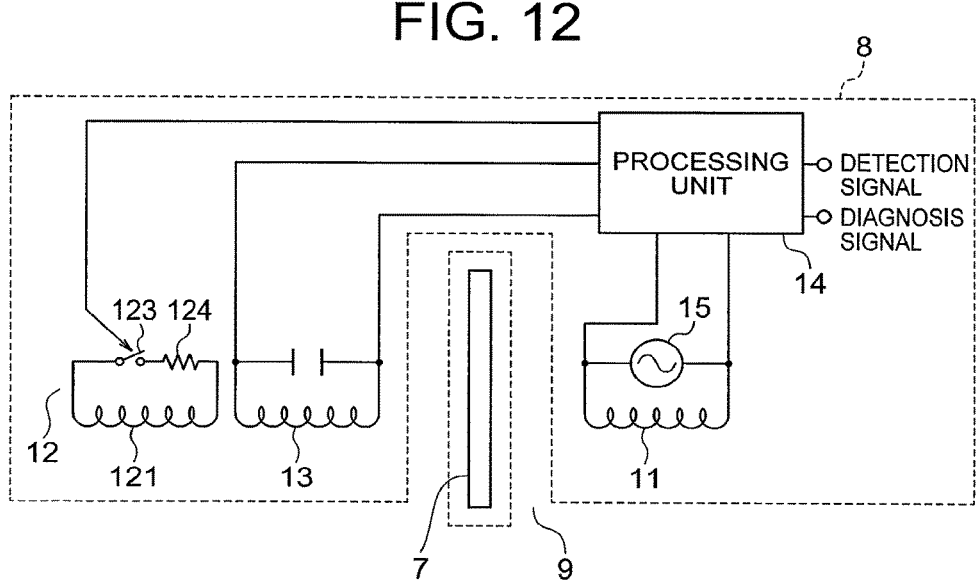
FIG. 12 is a view showing a configuration of an elevator position detection apparatus according to a ninth embodiment of this invention.

FIG. 12 is a view showing a configuration of an elevator position detection apparatus according to a ninth embodiment of this invention. In this embodiment, the diagnosis circuit 12 is configured identically to the diagnosis circuit 12 according to the third embodiment. In other words, in this embodiment, the diagnosis circuit 12 is a closed circuit in which the second diagnosis switch 123 and the resistor 124 are connected in parallel to the diagnosis coil 121 and connected in series to each other. All other configurations are identical to the seventh embodiment.

By configuring the diagnosis circuit 12 as a closed circuit in which the second diagnosis switch 123 and the resistor 124 are connected in parallel to the diagnosis coil 121 and connected in series to each other in this manner, diagnosis of the constant H output fault in the sensor 8 can be improved in precision while simplifying the configuration of the diagnosis circuit 12.

Tenth Embodiment

Figure 13:
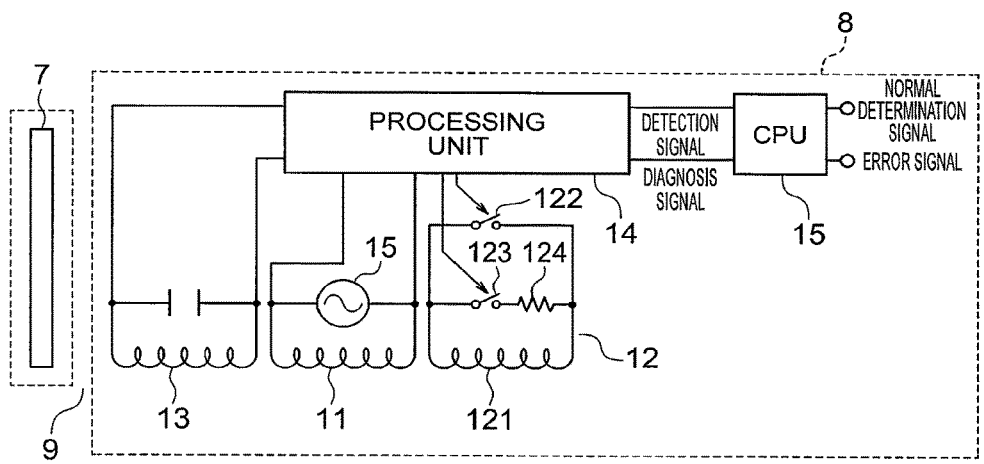
FIG. 13 is a view showing a configuration of an elevator position detection apparatus according to a tenth embodiment of this invention.

FIG. 13 is a view showing a configuration of an elevator position detection apparatus according to a tenth embodiment of this invention. The sensor 8 further includes a CPU 15 that outputs the diagnosis signal including the information for switching to either the constant H output fault diagnosis mode or the constant L output fault diagnosis mode to the processing unit 14, and receives the detection signal from the processing unit 14.

The CPU 15 sets the operating mode of the sensor 8 in the diagnosis mode corresponding to the information included in the diagnosis signal by outputting the diagnosis signal to the processing unit 14, and sets the operating mode of the sensor 8 in the normal mode by halting output of the diagnosis signal to the processing unit 14.

Further, when the operating mode of the sensor 8 corresponds to either the constant H output fault diagnosis mode or the constant L output fault diagnosis mode, the CPU 15 determines whether or not a fault has occurred in the sensor 8 by comparing the output condition of the detection signal from the processing unit 14 with the output condition corresponding to the diagnosis mode based on the diagnosis signal. More specifically, while the operating mode of the sensor 8 corresponds to the constant H output fault diagnosis mode, the CPU 15 makes the H output normal determination, i.e. determines that the constant H output fault has not occurred, when the output condition of the detection signal from the processing unit 14 is identical to the L output condition, and makes the H output fault determination, i.e. determines that the constant H output fault has occurred, when the output condition of the detection signal from the processing unit 14 differs from the L output condition. Further, while the operating mode of the sensor 8 corresponds to the constant L output fault diagnosis mode, the CPU 15 makes the L output normal determination, i.e. determines that the constant L output fault has not occurred, when the output condition of the detection signal from the processing unit 14 is identical to the H output condition, and makes the L output fault determination, i.e. determines that the constant L output fault has occurred, when the output condition of the detection signal from the processing unit 14 differs from the H output condition.

When a fault diagnosis is performed on the sensor 8, the CPU 15 outputs a normal determination signal to the control apparatus after determining that the sensor 8 is normal, and outputs an error signal to the control apparatus after determining that a fault has occurred therein. The control apparatus controls the operation of the elevator on the basis of the signal from the CPU 15. All other configurations are identical to the first embodiment.

By incorporating the CPU 15 into the sensor 8 and having the CPU 15 determine whether or not a fault has occurred in the sensor 8 in this manner, the existence of a fault in the sensor 8 can be determined internally in the sensor 8 (in other words, the sensor 8 can be provided with a fault-related self-diagnosis function).

Note that in this example, the CPU 15 is incorporated into the sensor 8 according to the first embodiment, but the CPU 15 may be included in the sensors 8 according to the second to ninth embodiments.

Further, in the above embodiments, the identification plate 7 is provided in the hoistway 1 and the sensor 8 is provided in the car 2, but instead, the identification plate 7 may be provided in the hoistway 1 and the sensor 8 may be provided in the car 2.

Furthermore, in the above embodiments, the sensor 8 is provided in the car 2, but the sensor 8 may be provided on the counter weight that serves as the elevating body. Alternatively, the identification plate 7 may be provided on the counter weight and the sensor 8 may be provided in the hoistway 1.

The invention claimed is:
1. An elevator position detection apparatus comprising:
a detection subject body; and
a sensor that detects presence of the detection subject body within a detection region,
wherein the detection subject body is provided in one of an elevating body and a hoistway through which the elevating body moves in a vertical direction, and the sensor is provided in the other;
the sensor includes:
an excitation coil that applies an AC magnetic field to the detection subject body to cause the detection subject body to generate an eddy current magnetic field when the detection subject body is in the detection region, a diagnosis circuit that includes a diagnosis coil and a diagnosis switch unit, wherein the diagnosis coil generates an induced magnetic field in response to the AC magnetic field from the excitation coil when the diagnosis switch unit is closed, a measurement coil that outputs a measurement signal upon reception of the AC magnetic field from the excitation coil, and reduces an output value of the measurement signal in accordance with the generated magnetic field, when at least one of the eddy current magnetic field and the induced magnetic field are generated, and a processing unit that switches an operating mode of the sensor upon reception of a diagnosis signal, and outputs a detection signal in a different output condition depending on whether or not the output value of the measurement signal from the measurement coil is lower than a threshold.

2. The elevator position detection apparatus according to claim 1, wherein the diagnosis switch unit includes a first diagnosis switch, the diagnosis circuit generates a first induced magnetic field from the diagnosis coil in response to the AC magnetic field from the excitation coil when the first diagnosis switch is closed, the measurement coil reduces the output value of the measurement signal in accordance with the generated magnetic field, when at least one of the eddy current magnetic field and the first induced magnetic field are generated, the processing unit switches the operating mode of the sensor from a normal mode, in which generation of the first induced magnetic field is stopped, to a constant L output fault diagnosis mode, in which the first induced magnetic field is generated by the diagnosis coil, in the normal mode, the output value of the measurement signal falls below the threshold when the detection subject body enters the detection region and equals or exceeds the threshold when the detection subject body leaves the detection region, and in the constant L output fault diagnosis mode, the output value of the measurement signal falls below the threshold regardless of whether or not the detection subject body is in the detection region.

3. The elevator position detection apparatus according to claim 1, wherein the switch unit includes a second diagnosis switch, the diagnosis circuit generates a second induced magnetic field from the diagnosis coil in response to the AC magnetic field from the excitation coil when the second diagnosis switch is closed, the measurement coil outputs the measurement signal and reduces the output value of the measurement signal in accordance with the generated magnetic field, when at least one of the eddy current magnetic field and the first induced magnetic field are generated, upon reception of the AC magnetic field from the excitation coil, the processing unit switches the operating mode of the sensor from a normal mode, in which the second induced magnetic field is generated by the diagnosis coil, to a constant H output fault diagnosis mode, in which generation of the second induced magnetic field is stopped, in the normal mode, the output value of the measurement signal falls below the threshold when the detection subject body enters the detection region and equals or exceeds the threshold when the detection subject body leaves the detection region, and in the constant H output fault diagnosis mode, the output value of the measurement signal equals or exceeds the threshold regardless of whether or not the detection subject body is in the detection region.

4. The elevator position detection apparatus according to claim 3, wherein the switch unit includes a first diagnosis switch and a second diagnosis switch, the diagnosis circuit generates a first induced magnetic field from the diagnosis coil in response to the AC magnetic field from the excitation coil when the first diagnosis switch is closed, and generates a second induced magnetic field that is weaker than the first induced magnetic field from the diagnosis coil in response to the AC magnetic field from the excitation coil when the second diagnosis switch is closed, the measurement coil reduces the output value of the measurement signal in accordance with the generated magnetic field, when at least one of the eddy current magnetic field and the first induced magnetic field are generated, the processing unit switches the operating mode of the sensor from a normal mode, in which the second induced magnetic field is generated by the diagnosis coil, to either a constant L output fault diagnosis mode, in which the first induced magnetic field is generated by the diagnosis coil, or a constant H output fault diagnosis mode, in which generation of both the first and the second induced magnetic fields is stopped, in the normal mode, the output value of the measurement signal falls below the threshold when the detection subject body enters the detection region and equals or exceeds the threshold when the detection subject body leaves the detection region, in the constant L output fault diagnosis mode, the output value of the measurement signal falls below the threshold regardless of whether or not the detection subject body is in the detection region, and in the constant H output fault diagnosis mode, the output value of the measurement signal equals or exceeds the threshold regardless of whether or not the detection subject body is in the detection region.

5. The elevator position detection apparatus according to claim 1, wherein the detection region is provided between the measurement coil and the excitation coil when the sensor is seen from a movement direction of the elevating body.

6. The elevator position detection apparatus according to claim 5, wherein the diagnosis coil is disposed on an identical side to the measurement coil from the viewpoint of the detection region when the sensor is seen from the movement direction of the elevating body.

7. The elevator position detection apparatus according to claim 1, wherein the sensor further includes a CPU that outputs the diagnosis signal to the processing unit, and determines whether or not a fault has occurred in the sensor by comparing the output condition of the detection signal from the processing unit with an output condition corresponding to a diagnosis mode based on the diagnosis signal.

* * * * *